US012746099B2

(12) United States Patent
Carrafiello

(10) Patent No.: US 12,746,099 B2
(45) Date of Patent: Sep. 29, 2026

(54) ORTHODONTIC DEVICE FOR CRANIAL ADAPTATIONS

(71) Applicants: BIOMAX S.P.A., Vicenza (IT); GRUPPO EUROPEO DI ORTODONZIA S.R.L., Rome (IT); OP S.R.L., Reggio Emilia (IT)

(72) Inventor: Alessandro Carrafiello, Cadelbosco di Sopra (IT)

(73) Assignees: BIOMAX S.P.A, Vicenza (IT); GRUPPO EUROPEO DI ORTODONZIA S.R.L., Rome (IT); P S.R.L., Reggio Emilia (IT)

( * ) Notice: Subject to any disclaimer, the term of this patent is extended or adjusted under 35 U.S.C. 154(b) by 306 days.

(21) Appl. No.: 18/016,962

(22) PCT Filed: Jul. 16, 2021

(86) PCT No.: PCT/IT2021/000037
§ 371 (c)(1),
(2) Date: Jan. 19, 2023

(87) PCT Pub. No.: WO2022/018773
PCT Pub. Date: Jan. 27, 2022

(65) Prior Publication Data
US 2023/0277279 A1 Sep. 7, 2023

(30) Foreign Application Priority Data
Jul. 24, 2020 (IT) ........................ 102020000018034

(51) Int. Cl.
*A61C 7/08* (2006.01)
*A61C 7/10* (2006.01)

(52) U.S. Cl.
CPC ................. *A61C 7/08* (2013.01); *A61C 7/10* (2013.01)

(58) Field of Classification Search
CPC .... A61C 7/08; A61C 7/10; A61C 7/36; A61C 7/00; A63B 71/085; A61F 5/56; A61F 5/566; A61F 5/58; A61F 2005/563
(Continued)

(56) References Cited

U.S. PATENT DOCUMENTS 5,152,301 A * 10/1992 Kittelsen .............. A63B 71/085 128/846
2010/0196837 A1 * 8/2010 Farrell ...................... A61C 7/08 433/6
2014/0238419 A1 * 8/2014 Lovat ................... A63B 71/085 128/862
(Continued)

FOREIGN PATENT DOCUMENTS

CN 110 025 388 7/2019
WO 2014/012827 1/2014
WO WO-2019083437 A1 * 5/2019 ............... A61C 7/08

OTHER PUBLICATIONS

International Search Report issued Nov. 18, 2021 in International Application No. PCT/IT2021/000037.
(Continued)

*Primary Examiner* — Heidi M Eide
*Assistant Examiner* — Lina Faraj
(74) *Attorney, Agent, or Firm* — Wenderoth, Lind & Ponack, L.L.P.

(57) ABSTRACT

An orthodontic device for cranial adaptations envisaged to be allocated between a patient's two dental arches. The device includes a lower vestibular shield (3) envisaged to engage externally with the dental arch not concerned by the treatment, and a front shield (4) designed to rest against the incisors. A palatal shield (40) is provided to strengthen the pressure which the patient applies while contracting the musculature and to allow the maxillae to expand, thereby widening the upper arch. Additionally, the device features an upper lingual shield (5) equipped with a lingual ramp (50) envisaged to ensure the tongue remains in a specific well-
(Continued)

defined area, at the incisor teeth, and delimited on one side by the device and on the other by lingual pins (11) present in an aligner (10) which the patient must wear since the device works in conjunction with the aligner, aided by a median ridge (9).

11 Claims, 4 Drawing Sheets

(58) Field of Classification Search
USPC .................................................. 128/859–862
See application file for complete search history.

(56) References Cited

U.S. PATENT DOCUMENTS

| | | | | |
|---|---|---|---|---|
| 2016/0157962 | A1* | 6/2016 | Kim | B29C 65/48 156/242 |
| 2016/0199216 | A1* | 7/2016 | Cam | A61F 5/566 128/848 |
| 2017/0106267 | A1* | 4/2017 | Garner | A61M 16/0493 |
| 2017/0325913 | A1 | 11/2017 | Bergersen | |
| 2020/0093571 | A1 | 3/2020 | Shanjani et al. | |

OTHER PUBLICATIONS

Written Opinion of the International Searching Authority issued Nov. 18, 2021 in International Application No. PCT/IT2021/000037.

* cited by examiner

ORTHODONTIC DEVICE FOR CRANIAL ADAPTATIONS

TECHNICAL FIELD

The present invention refers to an orthodontic device for cranial adaptations which is particularly suitable to obtain precise dental positioning and is of a perfectly acceptable size in terms of interpersonal relationships and to be used in conjunction with aligners, following a specific use protocol.

BACKGROUND ART

As is known, a dental brace is a medical device used by an orthodontist (the dentist which specialises in this type of treatment) to align the patient's teeth in order to ensure correct chewing, better oral hygiene, and improved dental aesthetics.

Dental braces are used to solve and/or prevent a series of problems related to dentition, such as treating misalignments by moving the teeth in the desired direction according to orthodontics.

In particular, a dental brace is a medical device that is installed to straighten crooked or overlapping teeth, to widen or narrow the palate, or to correct malocclusion. By virtue of its numerous uses, there are many different types of brace, each one suited to the needs of each person, both during childhood and adulthood, and on which needs the length of use of the device also depends.

The first braces designed for orthodontic purposes were created in the 1960*s* and had a horseshoe shape that formed an arch with an upwards-facing U-shaped section. These braces only embraced the upper arch and were made of natural rubber. These devices, illustrated in patents FR67616 and FR1104897, delivered good results, especially in adolescents, but were later abandoned due to the poor dental positioning accuracy obtained compared to the metal "bracket" version, which was more precise.

Subsequently, a return was made to the idea of devices made of an elastic material. Some devices have a dental arch-shaped structure made in various sizes and featuring a double U-shaped section that can accommodate the teeth of both the upper and lower arches. In more detail, the aforesaid devices feature a vestibular shield, i.e. a flange that occupies the space between the teeth and the inside of the cheeks with an internal part that connects everything together, wherein the internal part occupies the space between the teeth and the tongue and therefore is shaped so as not to impair lingual movements and to guide the tongue into an upwards position itself.

The structure of the device described features slight construction variations according to the different types of malocclusions which the device is intended to remedy, wherein the thickness of the occlusal surface, of the vestibular flange, or of the internal part varies.

The devices described provide excellent input for correct growth of the constituent bones of the skull and mouth (maxillae and mandible), while also bringing benefits in terms of tooth positioning, especially in children and adolescents.

In the event, however, of teeth which are already in position, such as in adults or older adolescents, these devices do not ensure adequate precision regarding the position of individual teeth, as they are not designed to be anchored directly to the teeth, which means they are not the most suitable option for adults, also due to the fact that they need to be used for at least 14 hours a day, otherwise the desired results will not be obtained.

The aforesaid devices have various drawbacks, including inaccurate tooth positioning and a bulkiness that renders them incompatible with interpersonal relationships, due also to the fact that the clinical time needed to obtain even a minimal objective is long, i.e. approximately 36-48 months in an adult.

Another problem that has emerged is that the results obtained in adults or in young people at the end of their growth are generally poor and lingual re-education is rather generic, and also difficult in adults, since the various internal parts, in practice, force the tongue to change position without giving it any precise direction. Furthermore, in adults, memorisation of the new lingual and buccal muscle engrams is statistically ineffective if left to voluntary exercises alone.

Another problem encountered by the devices currently in use is due to the fact that they are generally used in conjunction with other orthodontic systems without the application of a specific protocol linked to a preestablished clinical goal.

In addition to the information above, the applicant is aware of Patent n. 10201600044898, which describes an orthodontic device intended to be interposed between a user's upper dental arch and lower dental arch, comprising at least one arch-shaped channel to at least partially house a dental arch, the channel comprising at least one occlusal base intended to be positioned along the occlusal surface of the user and at least one wall projecting laterally to the occlusal base and intended to come into contact with the vestibular or palatal side of at least one of the user's teeth and characterised by the fact that the canal is made at least partially of a first material, wherein the first material is more elastically deformable than the second.

Nowadays, the need to take care of one's body and appearance is increasingly felt by people and one element which contributes to looking one's best is undoubtedly one's face and, in particular, one's mouth and teeth. Indeed, a well-cared-for mouth and a beautiful smile helps one attract the attention of those around you and makes you feel confident and more accepted within interpersonal relationships.

Indeed, when one is at talking distance from another person, the eyes and mouth are the physical features of a face that are most noticed and watched and contribute to the overall image of the speaker, beyond their purely external appearance. A tidy set of teeth is also synonymous with a good anatomical arrangement of the teeth and correct functional capacity in terms of chewing.

SUMMARY OF INVENTION

The object of the present invention is essentially to solve the problems of the commonly known technique by overcoming the drawbacks described above by means of an orthodontic device for cranial adaptations which can interact with aligners to obtain perfect dental alignment with optimal cranial adaptation.

A second object of the present invention is to provide an orthodontic device for cranial adaptations which can be customised according to the cranial arrangement of each individual despite being a mass-produced product and which has alternating flanges.

A third object of the present invention is to provide an orthodontic device for cranial adaptations which ensures very precise tooth positioning with compact overall dimensions so as not to limit or adversely affect users' interpersonal relationships.

Another object of the present invention is to provide an orthodontic device for cranial adaptations which delivers results in a short space of time in adults or in young people at the end of their growth.

Another object of the present invention is to provide an orthodontic device for cranial adaptations which can manage the functions of muscles such as the buccinator and the rear two-thirds of the tongue.

A further object of the present invention is to provide an orthodontic device for cranial adaptations which can guide and manage a patient's lingual re-education.

A further but not final object of the present invention is to provide an orthodontic device for cranial adaptations which is easy to make and works well.

These aims and others besides, which will better emerge over the course of the present description, are essentially achieved by means of an orthodontic device for cranial adaptations, as outlined in the claims below.

BRIEF DESCRIPTION OF DRAWINGS

Further characteristics and advantages will better emerge in the detailed description of an orthodontic device for cranial adaptations according to the present invention, provided in the form of a non-limiting example, with reference to the accompanying drawings, in which.

Figure 1:
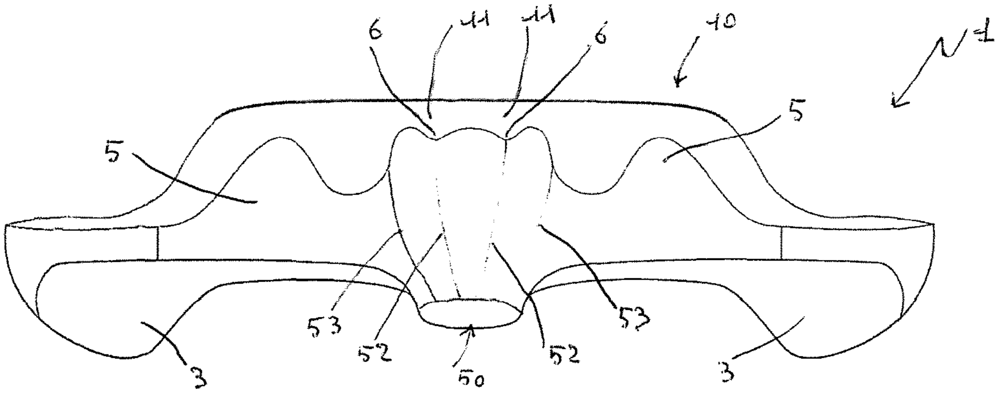
FIG. 1 shows, schematically and from a rear view, an orthodontic device for cranial adaptations, combined with an aligner, in accordance with the present invention.
Figure 2:
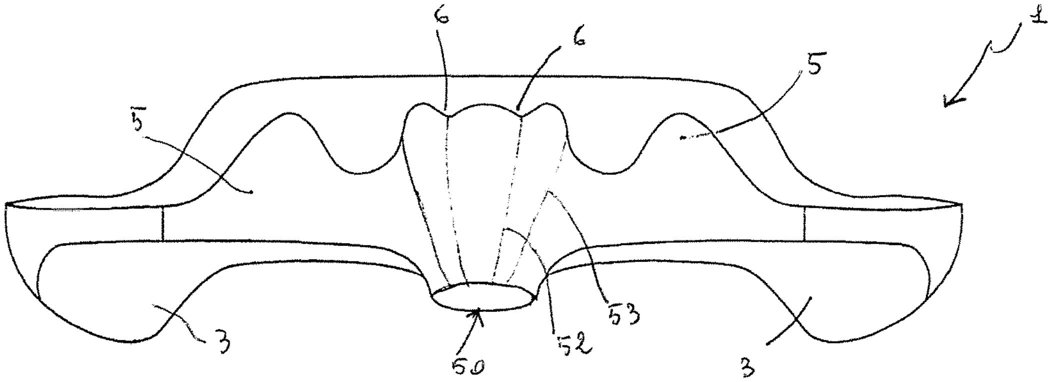
FIG. 2 shows, schematically and from a rear view, the orthodontic device in FIG. 1.
Figure 3:
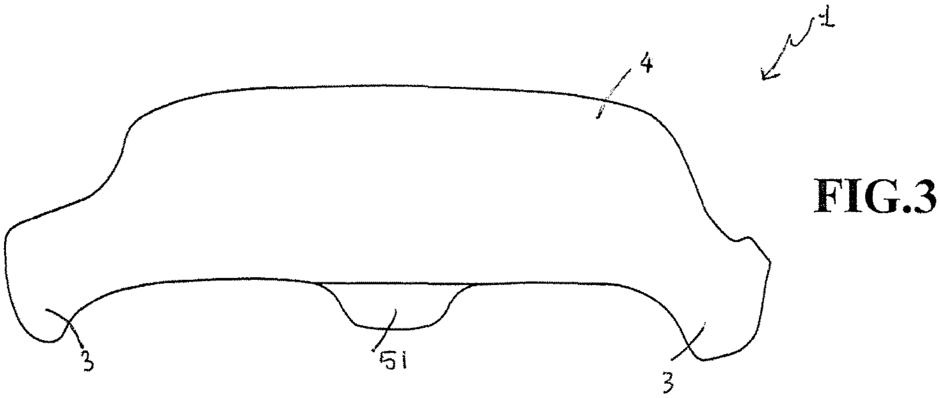
FIG. 3 shows, schematically and from a front view, the orthodontic device in FIG. 1.

With reference to the figures, and in particular FIG. 1, 1 denotes, as a whole, an orthodontic device for cranial adaptations according to the present invention.

DETAILED DESCRIPTION OF PREFERRED EMBODIMENTS

Figure 4:
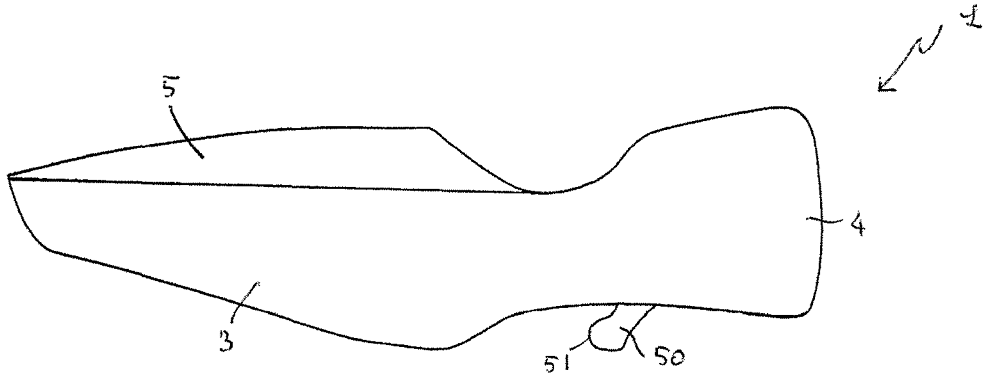
FIG. 4 shows, schematically and from a side view, the orthodontic device in FIG. 1.
Figure 5:
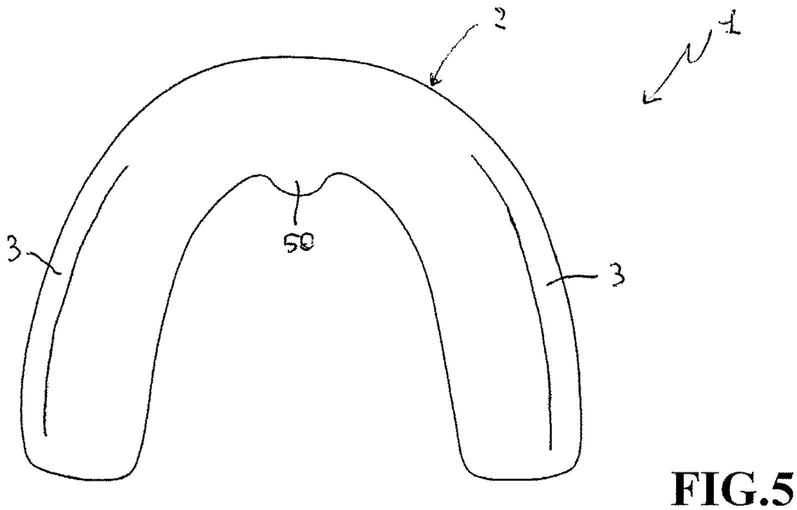
FIG. 5 shows, schematically and from a bottom-up view, the orthodontic device in FIG. 1.

The orthodontic device for cranial adaptations 1 in question is envisaged to be allocated between the two dental arches of a patient and comprises a U-shaped element having an upper seat 2 to accommodate the dental arch involved in the treatment while on the opposite side a lower vestibular shield 3 is envisaged on both sides of the U which is envisaged to engage externally to the dental arch not involved in the treatment as shown in FIGS. 4 and 5. The device features a central front shield 4 arranged to rest against the incisors.

More specifically, it features the presence of alternating shields: the frontal one 4 and the palatal one 40 in the upper part and the vestibular ones 3 in the lower part, promote the expansion of the maxillae and allow control over the relationship with the lower arch for a correct transversal dimension between the maxillae and the mandible, as the expansion of the maxillae must be proportionate to the patient's cranial scheme and mandibular size.

The aforesaid configuration of the shields reinforces the pressure that the patient applies while contracting the musculature and, in particular, the palatal shields 40 allow to expand the maxillaries, widening the upper arch (indeed, in malocclusions, in 90% of cases, the upper arch is narrow) while, underneath, the vestibular shields 3 contain the lower arch. The vestibular shields 3 become very useful in the event of tooth cross situations, where two synchronous movements are necessary, i.e. an upper expansion movement and a lower contraction movement, since the teeth engage in the opposite way to the way they should, i.e. with a scissor movement.

According to the present embodiment, the device 1 features an upper lingual shield 5 located inside, at the centre of the U and equipped, centrally, with a lingual ramp 50 envisaged to ensure the tongue remains in a specific well-defined area, at the incisors, and delimited on one side by the device and on the other by lingual pins 50 present in aligners 10, as better described later on.

More in detail, the lingual ramp 50 consists of a lower part 51, which is slightly curved towards the inside of the mouth, as shown in FIG. 4, so as to guide the tongue upwards towards the small ribs 52, known as 'palatal rughae', located immediately behind the upper incisors, as shown in FIG. 1. Furthermore, the lingual ramp features two vertical grooves 53, also visible in FIG. 1, which guide the tongue along the path of elevation, but above all it ends with a conformation featuring an upper edge with a double recess 6 (connection recesses), which forms a functional whole with the lingual pins 11 of the aligner 10 which the patient has to wear.

In accordance with the present invention, one variant, shown in FIGS. 8, 9, and 10, comprises, in addition to the elements described above, a series of inclined sectoral surfaces 7 located inside the seat 2 and positioned as follows: the first surface 7*a* in correspondence with the premolar teeth, the second surface 7*b* with the molar teeth, and the third surface 7*c* in proximity to the free end of the U.

These inclined surfaces protrude from the base of the seat 2 and have an essentially trapezoidal section with the side facing outwards, which is slightly arched, being designed to rest against the inside of the cheek.

The inclined sectoral surfaces 7*a*, 7*b*, and 7*c* are arranged in a predetermined and strategic way so as to be able to customise, case by case in a simple but effective way, the areas that will have to give strength to the dental and skeletal movements one intends to impart with the treatment.

An inclined surface on which the arches rest, applying force, during the tightening transmits an oriented force to the bone structures which house the roots. The particular arrangement of these inclined surfaces stimulates the expansion of the palate, but individual surfaces can be eliminated so that, by leaving only some of them in place, localised, customised expansion can be achieved, according to the needs of the clinical case. These inclined surfaces act in combination with sectoral reinforcements 12 present in the aligners; a whole is therefore created in terms of the direction of the forces applied to reshape the palate and move the teeth. In addition to the information above, the inclined surfaces 7, of which—in the present embodiment—there are three on each side, as shown in FIG. 8, can optionally be removed so that a highly customised functional device is achieved despite being a mass-produced device.

Figure 7:
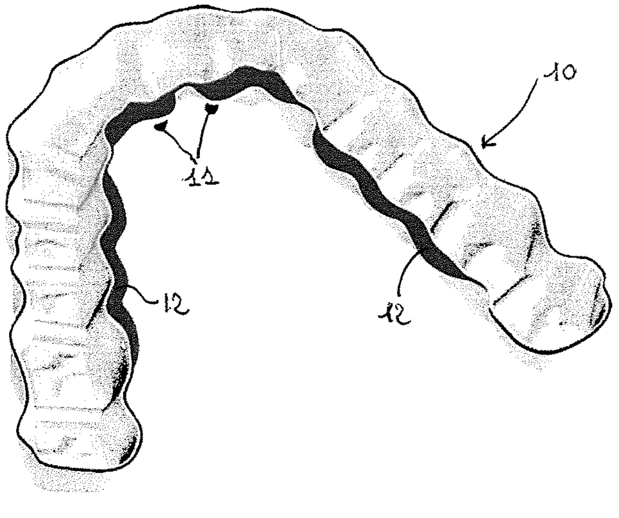
FIG. 7 shows, schematically and from a top-down view, the aligner in FIG. 6.

According to the present invention, the inclined sectoral surfaces 7 connect functionally to the anatomy of the palate at the sutures thereof, i.e. the sagittal, interincisal, and cruciform sutures. These aforesaid sutures form the basis of the design of the reinforcements 12 present in the aligners 10, which are arranged in the same layout, as shown in FIG. 7. When the patient tightens the arches, the inclined surfaces 7 transmit the force to the aligner 10, which, with the sectoral reinforcements 12, acts on the mobility of certain sectors and pressure is exerted by the customised thicknesses 7, thereby obtaining a fully customised and effective treatment, tailored to each patient.

Figure 9:
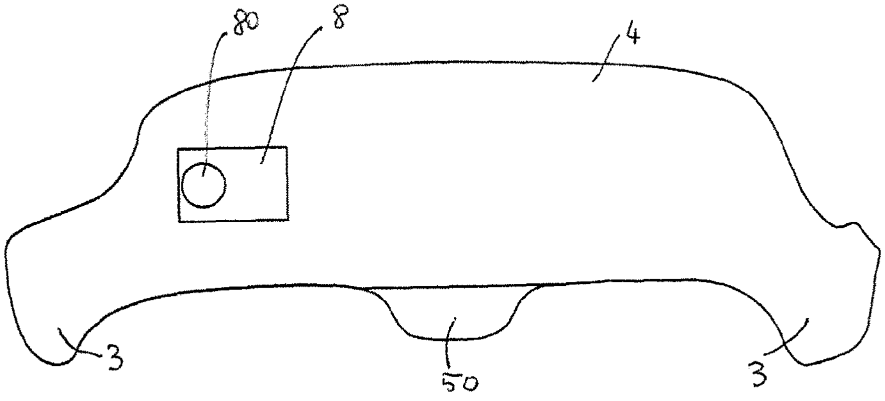
FIG. 9 shows, schematically and from a front view, the orthodontic device in FIG. 8.
Figure 10:
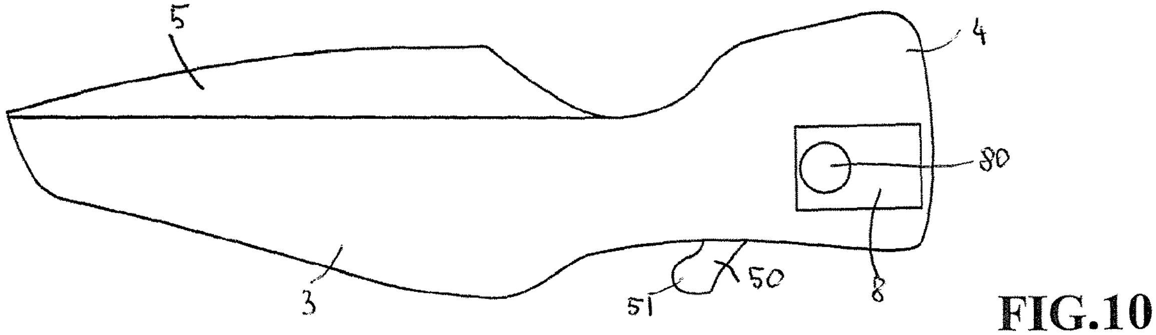
FIG. 10 shows, schematically and from a side view, the orthodontic device in FIG. 8.

Furthermore, the device comprises a microchip pocket 8 made of an elastic material, the said pocket being obtained in the thickness of the said device and being envisaged to house a microchip 80 equipped with a thermal sensor which will ensure patient compliance and will provide useful data for monitoring the treatment, as shown in FIG. 9.

In addition to the information above, the device features a median ridge 9 which ensures a precise engagement between the aligners 10 and the device 1.

Figure 8:
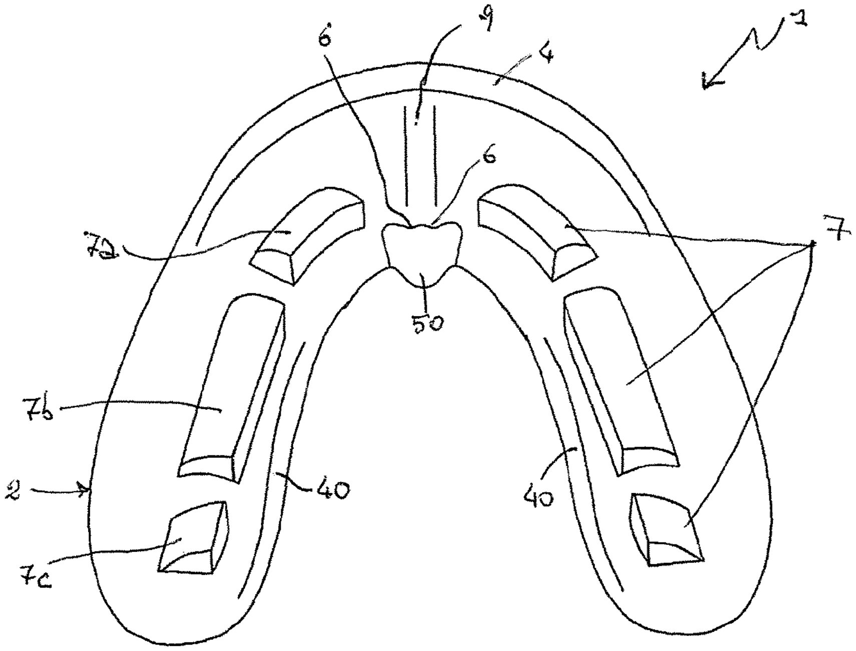
FIG. 8 shows, schematically and from a top-down view, a variant of the orthodontic device in question.

In the present embodiment and as shown in FIG. 8, the said crest 9 has a height of approximately 0.5-0.8 mm, so as not to alter the tooth-to-tooth contact but which is, in any case, sufficient to fit between the two central incisors, which generally have a groove therebetween at the incisal edge.

Figure 11:
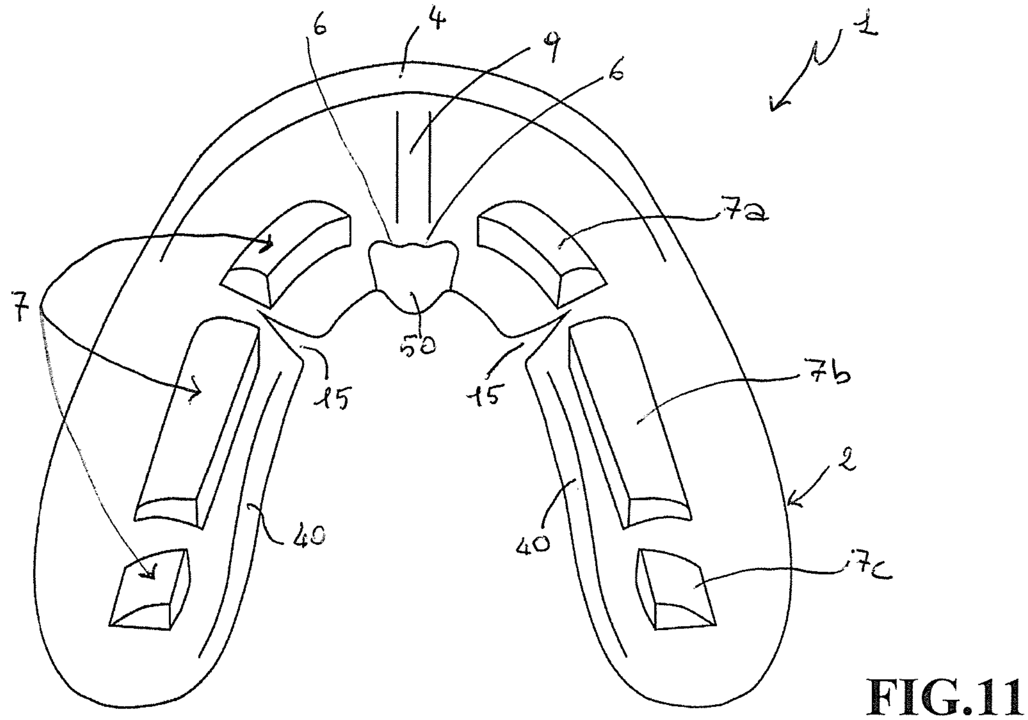
FIG. 11 shows, schematically and from a top-down view, a second variant of the orthodontic device according to the present invention.
Figure 12:
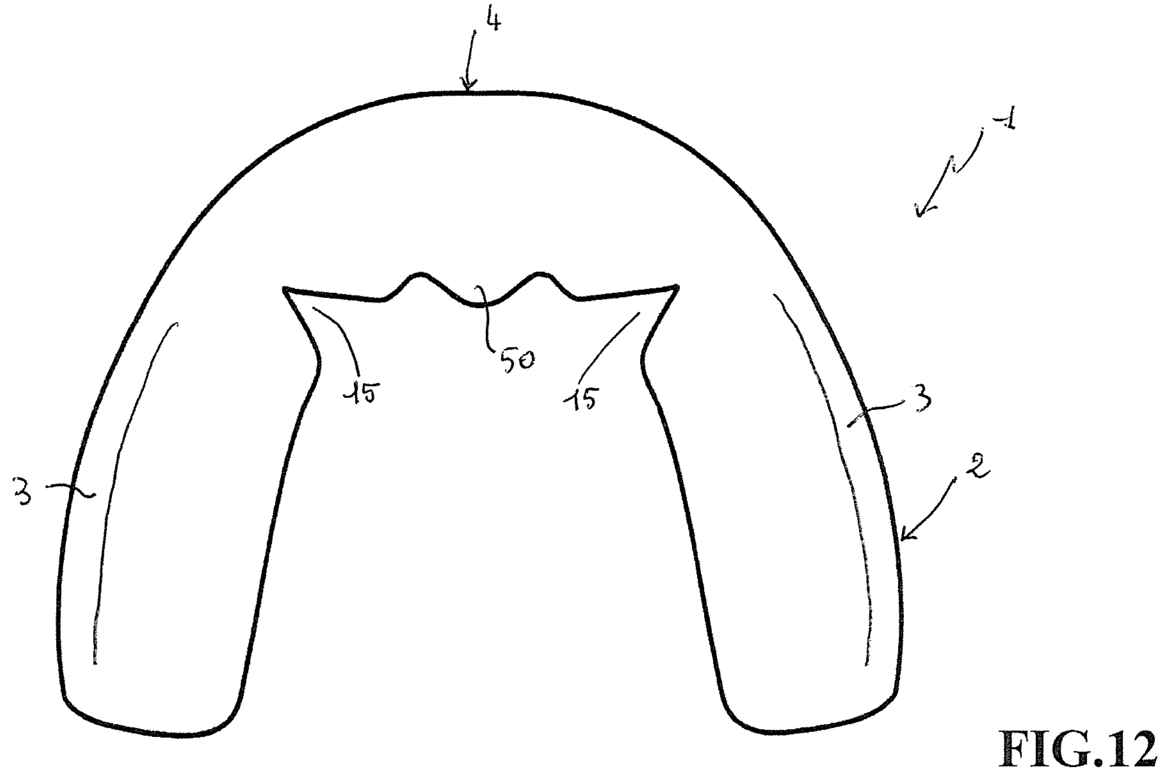
FIG. 12 shows, schematically and from a bottom-up view, the orthodontic device in FIG. 11.

Also in accordance with the present invention and as shown in FIGS. 11 and 12, the device features at least a pair of wedge-shaped adapter cuts 15 which allow a lateral movement which widens the U, offering optimal dimensional adaptation in the transverse direction to the various different sized arches, making the size of the device practically "universal".

In particular, the constituent mixture of the device has a hardness which is specifically designed and calibrated to functionally re-educate the chewing and base skull muscles and allows complete, balanced muscle contraction, without being either overly soft or overly hard.

As described above, the orthodontic device according to the present invention envisages a first version shown in FIGS. 1 to 5 and a version, shown in FIGS. 8 to 11, featuring additional elements to ensure a more precise, more sophisticated customised treatment.

Finally, the device with the adapter cuts is very flexible and can be adapted transversely to create any distance between the dental arches.

Figure 6:
FIG. 6 shows, schematically and from a bottom-up view, an aligner as shown in FIG. 1.

As mentioned earlier, the orthodontic device in question is intended to be combined with an aligner 10, shown in FIGS. 6 and 7. The aligner 10, which is of an essentially known type, has lingual pins 11 designed to engage in the connection recesses 6 present in the device. More specifically, the lingual pins 11 consist of small protrusions placed in a strategic position, i.e. behind and beside the interincisal papilla. The task of the lingual pins 11 is to guide, in combination with the lingual elevator 50 (which has the grooves 52 running in the same direction as the said pins), the tongue towards a physiological functional path. The tongue is thereby re-educated for the entire duration of the treatment, which can last from 12 to 24 months, because resting against the palate helps to reshape it correctly, with great benefits.

The lingual action has a palate-shaping action, which is implemented, thereby modifying the palate form.

The modification of the palate ensures better positioning of the teeth which, as housed in a wider and correctly shaped palate, can be moved more quickly and with greater ease. Furthermore, the aligner 10 used in conjunction with the device has 12 individual sectoral reinforcements designed to stimulate skeletal adaptations.

In practice, the sectoral reinforcements 12 are enlargements/extensions made of the same material as the aligner and arranged according to the cranial sutures. Coupled with the orthodontic device in question, these enlargements/extensions ensure easy and physiological reshaping of the palate.

As already described, the orthodontic device 1, as shown in FIG. 1, is designed to be combined with an aligner 10 according to a specific use protocol, i.e. it must be worn for at least 30 minutes each day, at the same time as the aligner, and the patient must tighten the arches for at least 30 minutes a day.

In practice, combined use of the orthodontic device and the aligner results in a treatment that combines the advantages of two—until now—separate treatment methods (one using sequential aligners and one using an elastic device), thereby shortening the time needed to achieve the pre-established clinical objective, since greater precision in tooth positioning can be achieved.

Furthermore, it is possible to achieve a skeletal adaptation of the underlying bones, which makes the result more stable over time and makes it possible to customise the treatment.

In particular, it helps to functionally re-educate the tongue with great effectiveness since the tongue is guided towards the palate and, above all, towards the lingual pins.

The orthodontic device 1, operating in conjunction with the aligner 10, allows precise, predetermined dental positioning to be obtained.

In particular, one specific digital design of the aligners coupled with the device promotes significant skeletal expansion even in adults and the treatment time is considerably reduced, with the desired clinical results achieved, in most cases, over a period ranging from 6 to 18 months.

Thus the present invention achieves the objects set.

The orthodontic device for cranial adaptations in question can interact with aligners to obtain perfect dental alignment with optimal cranial adaptation, unlike that which occurs with the systems according to commonly known technique, which envisages the two actions being performed individually.

Advantageously, the orthodontic device can be customised according to the skull pattern of each individual even though it is a mass-produced product.

Furthermore, the orthodontic device guarantees very precise dental positioning with a compact size, to limit and adversely affect users' interpersonal relationships.

Another advantage derives from the fact that the orthodontic device delivers results in a short space of time in adults, or in young people at the end of their growth.

Additionally, the orthodontic device can manage the functions of muscles such as the buccinator and the posterior two-thirds of the tongue, as well as guiding and managing the patient's lingual re-education through both upper palatal and lower vestibular shields.

A further advantage comes from the presence of the inclined sectoral surfaces 7 positioned on the upper occlusal part of the device, which allow customisation according to the individual cranial arrangement and are also integrated with the design of the aligners. These are elements are entirely lacking in the devices according to the commonly know technique.

A further but not final advantage of the present invention is that the said system proves to be remarkably easy to use and structurally simple, and works well.

Naturally, further modifications or variants may be applied to the present invention while remaining within the scope of the invention that characterises it.

The invention claimed is:

1. An orthodontic system for cranial adaptations configured to be allocated between a patient's upper and lower dental arches, comprising:

- a U-shaped element with a seat on an upper portion thereof to accommodate the upper dental arch for orthodontic treatment;
- a lower vestibular shield arranged on a lower portion of the U-shaped element, the lower vestibular shield being arranged on each of left and right sides of the U-shaped element, and being configured to engage externally with the lower dental arch and contain the lower dental arch;
- a front shield centrally arranged on the U-shaped element and configured to rest against upper incisor teeth of the patient; and
- an aligner configured to be arranged within the seat of the U-shaped element when the aligner is worn on the upper dental arch of the patient, the aligner having lingual pins;

wherein the U-shaped element further comprises:

- a palatal shield on the upper portion of the U-shaped element, the palatal shield being arranged on each of the left and right sides of the U-shaped element, the palatal shield being configured to strengthen a pressure which the patient applies while bringing the upper and lower dental arches into contact with each other and to allow a maxillae of the patient to expand, thereby widening the upper dental arch;
- an upper lingual shield arranged at a center of an inner surface of the U-shaped element, the upper lingual shield having a lingual ramp centered thereon, the lingual ramp being configured to ensure a tongue of the patient remains in a specific well-defined area which is at the incisor teeth such that the tongue is delimited laterally by the lingual ramp and by the lingual pins of the aligner;
- a median crest configured to allow precise engagement between the aligner and the seat, the median crest being arranged at a location corresponding to two central incisors of the patient; and
- a first series of inclined sectoral surfaces located inside the seat on the left side of the U-shaped element and a second series of inclined sectoral surfaces located inside the seat on the right side of the U-shaped element, wherein each series of inclined sectoral surfaces includes a first inclined sectoral surface arranged at premolar teeth of the patient, a second inclined sectoral surface arranged at molar teeth of the patient, and a third inclined sectoral surface adjacent to a free end of the U-shaped element, and wherein each of the inclined sectoral surfaces is removably mounted in the seat so as to protrude from a base of the seat, and has a trapezoidal section with an arched side facing outwards toward an inside of a cheek of the patient.

2. The orthodontic system according to claim 1, wherein the front shield, the palatal shield and the lower vestibular shield are configured to promote the expansion of the maxillae and allow control over a relationship with the lower dental arch for a correct transversal dimension between the maxillae and a mandible of the patient such that the expansion of the maxillae is proportionate to the patient's cranial scheme and mandibular size.

3. The orthodontic system according to claim 1, wherein the lingual ramp includes:

- a lower part which curves slightly towards an inside of a mouth of the patient so as to guide the tongue upwards;
- small ribs which are configured to be located immediately behind the upper incisors;
- two vertical grooves configured to guide a tongue elevation path; and
- an upper margin having a double recess conformation configured to interact with the lingual pins of the aligner.

4. The orthodontic system according to claim 1, wherein the U-shaped element is configured to be customized by individually removing one or more of the inclined sectoral surfaces of the first or second series of inclined sectoral surfaces such that the first and second series of inclined sectoral surfaces are arranged in a predetermined way, based on individual needs of the patient, so as to customize areas where strength must be given to dental and skeletal movements of the patient desired during the orthodontic treatment since an inclined surface of one of the inclined sectoral surfaces on which the upper dental arch rests strongly during clamping transmits a force oriented towards bone structures housing dental roots of the patient so as to stimulate an expansion of a palate of the patient.

5. The orthodontic system according to claim 1, wherein the first and second series of sectoral inclined surfaces act in conjunction with sectoral reinforcements arranged in the aligner so as to create forces leading to reshaping of a palate of the patient achieved by the expansion of the maxillae.

6. The orthodontic system according to claim 1, wherein the first and second series of sectoral inclined surfaces of the U-shaped element are configured to connect functionally, via the aligner, with the anatomy of a palate of the patient at a sagittal suture of the palate, an interincisive suture of the palate and a cruciform suture of the palate, and sectoral reinforcements are arranged in the aligner in a same manner as that of the sagittal, interincisive and cruciform sutures so as to correspond with the sagittal, interincisive and cruciform sutures, such that when the patient bites down, the first and second series of sectoral inclined surfaces transmit a force to the aligner.

7. The orthodontic system according to claim 1, further comprising a microchip pocket made of an elastic material, the microchip pocket being obtained in a thickness of the orthodontic device and being configured to house a microchip equipped with a thermal sensor for ensuring patient compliance and providing data for monitoring the orthodontic treatment.

8. The orthodontic system according to claim 1, wherein the median crest has a height of 0.5-0.8 mm so as to fit between the two central incisors of the patient without altering a dental contact of the patient.

9. The orthodontic system according to claim 1, further comprising at least a pair of wedge-shaped adapter cuts which allow a lateral movement which widens the U-shaped element such that the orthodontic device is adaptable to dental arches of different sizes.

10. The orthodontic system according to claim 1, wherein a constituent mixture of the device has a hardness which is specifically designed and calibrated to functionally correct chewing and base skull muscles of the patient, and which allows complete, balanced muscle contraction of the patient.

11. The orthodontic system according to claim 1, wherein the aligner includes:

the lingual pins, wherein the lingual pins are configured to engage with connection recesses formed in the lingual ramp, wherein the lingual pins include outward protrusions configured to be situated in a predetermined position behind and laterally to an interincisive papilla of the patient, wherein the lingual ramp has grooves which are aimed at the lingual pins, respectively, and wherein the lingual pins are configured to guide, in combination with the lingual ramp, the tongue towards a physiological functional path so as to re-educate the tongue for an entire duration of the orthodontic treatment; and sectoral reinforcements which are enlargements or extensions made of a same material as the aligner, the sectoral reinforcements being arranged according to cranial sutures of the patient and being configured to stimulate skeletal adaptations so as to allow a physiological re-shaping of a palate form of the patient achieved by the expansion of the maxillae.

* * * * *